Aug. 22, 1967   D. B. ALBRECHT   3,337,168
ELECTRICAL BOX SUPPORT
Filed Aug. 18, 1965
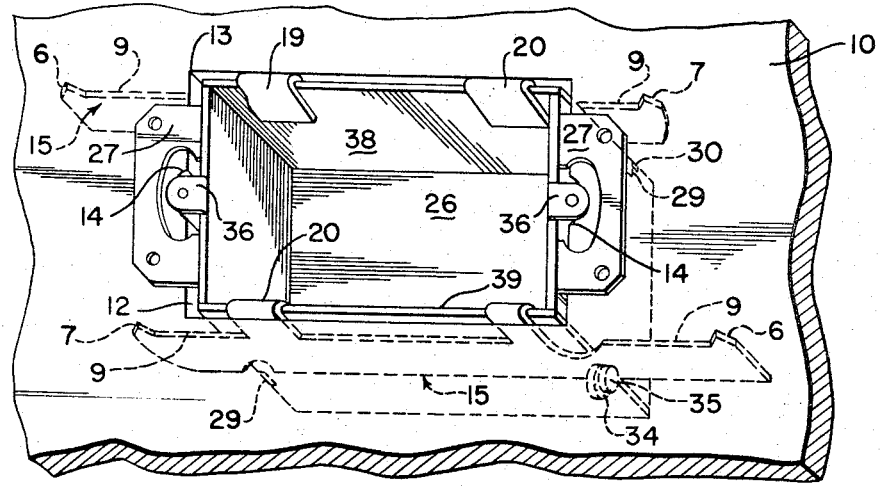
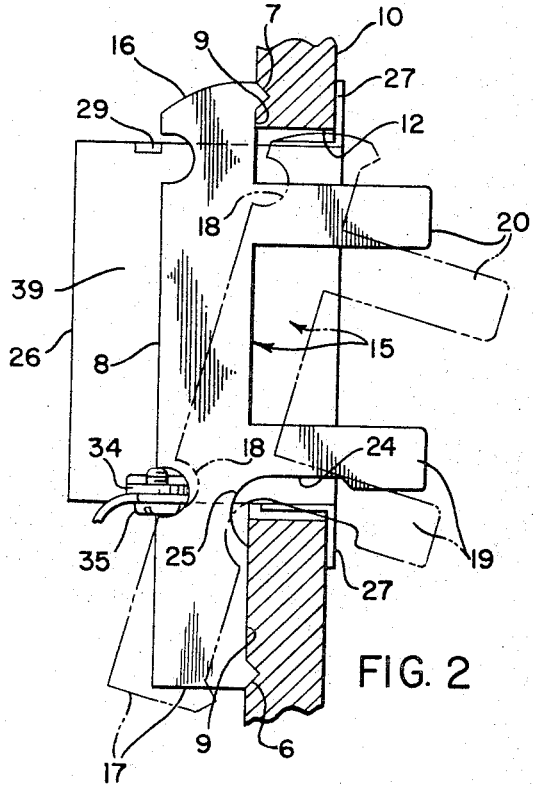
INVENTOR.
DAVID B. ALBRECHT
BY
*Fay & Fay*
ATTORNEYS 3,337,168
ELECTRICAL BOX SUPPORT
David B. Albrecht, Shaker Heights, Ohio, assignor to Madison Equipment Company, Cleveland, Ohio, a corporation of Ohio
Filed Aug. 18, 1965, Ser. No. 480,718
5 Claims. (Cl. 248—27)

ABSTRACT OF THE DISCLOSURE

The disclosure relates to a switch box securing device which is a flat thin metal bar with laterally extending specially removed fingers integrally formed with one edge of the bar. The bar terminates in a flat end a distance from one finger and terminates in a beveled end at the other end. A cutaway portion in the finger remote from the beveled end extending from a point intermediate the end of one finger and terminating in the adjacent side of the bar. A recess is formed along the opposite edge of the bar from that which the fingers are attached to accommodate the laterally protruding switch box ganging means, and a wall embedding projection emanating from the same edge of the bar as the fingers at a position intermediate one of the fingers and a terminal end of the bar.

---

This invention relates to electrical wiring products and more particularly to an electrical box support for securing electrical switch boxes into wall openings.

In the placement of electrical switch boxes at desired wall positions of buildings which have already been constructed or into buildings which have walls constructed out of commercially available materials such as wallboard, plaster, wood, etc., it has been found expedient to employ electrical switch box straps of a construction which include a thin flat sheet metal strip having an edge which engages the rearward surface of the wall, and which has laterally projecting fingers formed integrally with the rear wall surface engaging edge. The fingers are made of a resilient material and are capable of being bent about the switch box side walls to prevent outward movement of the box relative to the wall aperture.

Switch boxes in the most usual form are of the well-known rectangular type. When placed into the accommodating wall aperture, the inward movement of the switch box is limited by protuberances or ears, which are mounted in opposed projecting relationship to the upper and lower walls of the box, engaging the outward surface of the wall. However, unless appropriate means are provided to limit the outward movement of the box it is obvious that the box will not be held in the appropriate wall aperture. It is the purpose of my electrical switch box support to engage the rear of the wall and provide outwardly extending fingers which are clamped to the sides of the switch box to prevent any forward movement of the box.

In addition, modern switch boxes are provided with suitable clamping means on the upper and lower surfaces which cooperate with suitable compatible clamping means carried by the side walls thereof to permit a plurality of individual switch boxes to be ganged together where the installation so requires. It is, of course, necessary in ganged switch box operation that all of the side walls intermediate the two end walls be removed and the individual boxes be held in fixed relationship to the other. The usual clamping means provided on modern switch boxes include a threaded ear projecting from opposite sides of the upper and lower walls. The ear accommodates a screw which projects downwardly therefrom into an appropriate indenture in the side walls. The opposite side edge of both the upper and lower walls are provided with appropriate recess to accommodate a hooked spur projecting from each of the side walls of the switch box. Accordingly, upon removal of the appropriate screw a selected side wall may be removed and the switch box be available for ganging with a similarly modified box or boxes.

The provision of these opposed projecting ears on the upper and lower walls of the switch box complicates the clamping of the box to the wall by way of the switch box holding straps, in that the projections prevent the main body member of the individual bar or strap from assuming a flush contiguous relationship to the appropriate side wall of the switch box. Accordingly, an undesirable tilting of the longitudinal body member of the strap is experienced by the present switch box holders. It is, accordingly, obvious that the effect of the tilting of the longitudinal body member detracts from the strap providing a substantial bearing surface to the rear wall of the aperture. The result of this reduced bearing surface is an inadequately supported switch box. It should be here mentioned that Underwriters' specifications require that the holders support the switch box in an appropriate fashion to withstand a substantial outward pull applied thereto. It can, accordingly, be appreciated that a reduced rear surface contact between the longitudinal edge of the strap and the rear wall surface cannot be tolerated.

Furthermore, in addition to the hereinabove mentioned shortcomings in electrical box supports, I have also found that the inability to mount or secure the support to the rearward surface of the wall, after the main longitudinal body member has assumed a position inwardly of the box supporting wall aperture, has led to a loss of a great number of these units, partly due to the necessity of manipulating the device to the desired position contiguous with the one side of an electrical box and the wall aperture edge by the two available laterally extending strips or fingers. Even the slightest miscalculation under these circumstances can result in the support being dropped behind the wall. In any given project this loss can run into a considerable sum of money and time, and, accordingly, is undesirable.

It is an object of this invention to provide a flat metal fastening device which is capable of contiguous side-by-side relationship over the total expanse of the side walls of the switch box.

It is another object of this invention to provide a metal fastening device which provides the maximum bearing surface of the fastening device to the rear surface of the wall to which the box is to be mounted.

It is a further object of this invention to provide a switch box fastening device that is easy to manipulate and greatly reduces the time required to mount a switch box.

It is still another object of this invention to construct a securing device that may be inserted in the wall accommodating aperture without bending, sliding or tipping it, and still provide a contiguous side-by-side relationship thereof with the side walls of a switch box.

It is yet another object of this invention to provide means for embedding or locking the securing device to the back side of the wall in a position juxtaposed an electrical switch box.

In accordance with these objects and first briefly described my invention comprises a flat thin metal bar having a length which is substantially greater than its width. The bar has formed integral therefrom laterally projecting strips spacially removed from each other to provide switch box engaging fingers adjacent its ends. One of the strips being provided with a recess which terminates along the inner edge of the metal bar to provide an appropriate slot accommodating cutaway thereby. The metal bar being further provided with a recess along the outer edge thereof to accommodate appropriate box clamping projections from the upper and/or lower surfaces of the switch box. Wall penetrating means extending from the metal bar in the same direction as said strips for locking said unit in position juxtaposed the switch box and thus greatly enhance the ability of the electrician to secure the switch box in place by the use of the switch box engaging fingers without the fear of the device being lost behind the wall are also provided.

Other advantages, objects and distinctions of my present invention will become apparent in the following specification which relates to the accompanying drawings, and in which:

FIG. 1 is a perspective view showing my fastener locked in position and applied to a switch box mounted in a wall;

FIG. 2 is a side elevation of the box in a section of the adjacent wall showing the manner of inserting and embedding my fastening device;

FIG. 3 illustrates in elevation slightly in perspective one embodiment of my fastening device.

Referring to the drawings, by use of reference characters, there is shown a wall 10 which may be any suitable dimension, and which may be of any construction, having a usual switch box opening 12 cut therein. The opening 12 being of a shape to loosely receive the switch box 26. The corners 13 of the opening are provided to afford convenience of cutting the opening 12. Furthermore, surface notches 14 are provided to afford clearance for the cover clamping screws entering the threaded ears 36 mounted in opposing directions on the upper and lower walls of the box 26.

Likewise, fixedly mounted to the upper and lower surfaces of the box 26 are the usual outwardly projecting ears 27 which overlie the outer surface of the wall contiguous to the upper and lower edge of the appropriate wall aperture. Switch box 26 is further provided with fixedly removable sides 38 and 39. The upper and lower walls of the box are provided with individual oppositely directed, threaded ear projections 34 which accommodate a screw 35. Sides 38 and 39 are provided with appropriate indentures proximate to and immediately subadjacent the threaded aperture of ear 34 to accommodate the threaded depending body of screw 35. In addition, side walls 38 and 39 are provided with individual hooked spurs 29 carried on, and projecting inwardly from the edge of the switch box side wall, see FIG. 2. These hooked spurs are accommodated by suitable recess 30 in the upper and lower surfaces of the switch box 26. Therefore, in order to remove either side 38 or 39 all that is required is to remove the appropriate screw 35 from the projecting ear 34 and unhook spur 29 from the accommodating recess.

The above described projecting ear and hooked spur clamping means for each side of switch box 26 provides a suitable expedient for ganging an unlimited number of boxes in a side-by-side adjacent fashion. It is clear that if a plurality of adjacent side-by-side boxes are desired the side walls intermediately to end side walls can be removed by unscrewing the appropriate screw 35 and unhooking spur 29 from its accommodating recess. Screw 35 would then be secured to the hook accommodating recess 30 in the upper or lower surface, and in this manner an elongated switch box to facilitate a plurality of switching contacts may be fabricated. It is, of course, clear that the switch box of unlimited transverse dimension obtained will only retain a single side wall at opposite ends.

However, while projecting ear 34 lends itself for appropriate extension of individual switch boxes into a ganged relationship, it is also clear that projecting ear 34 presents new problems insofar as inhibiting a flush contiguous relationship between the sides of the box and the securing devices which are placed contiguous thereto for preventing forward movement of the box out of the appropriate wall slot. The usual supporting device, as seen in FIG. 3, includes a flat thin metal bar 15 which has a width of substantial dimension. It is obvious that the transverse dimension of the bar 15 assumes a side-by-side relationship with the appropriate side wall 38 or 39 of box 26, see FIG. 1 or 2. The edge 9 of the bar assumes an abutting relationship to the rear face of the wall in which the aperture for the switch box is formed. Furthermore, Underwriters' specifications require that the securing device be of a limited width, while at the same time being of sufficient rigidity to withstand a substantial switch box loading test. Accordingly, it is necessary that with the securing devices 15 positioned on either side of the switch box, as shown in FIG. 1, the devices be able to withstand a substantial load which is applied to the switch box in attempting to pull the box from the aperture.

It can thus be appreciated that the metal bar must be made of suitable material and be made with an appropriate transverse dimension to withstand a substantial load without collapsing under this rigorous test. It has been found that the bar must have a suitable transverse dimension and thickness in order to withstand this substantial loading test. It has also been found that providing the body member 15 with a suitable width to withstand the substantial loading test results in a transverse dimension which is too great to provide a contiguous side-by-side relationship with the adjacent side wall of the switch box, since projecting ear 34 will prevent a flush, side-by-side, contiguous relationship between the transverse dimension of the metal bar and the side of the switch box from existing. Further, a direct result of this improper contiguous relationship is an inappropriate and inadequate abutting relationship between edge 9 of the bar and the rear surface of the wall proximate the switch box opening is assumed. This improper abutting relationship between edge 9 and the rear surface of the wall, which is due to inability of the transverse dimension of bar 15 assuming a continguous relationship with the sides of the switch box because of the obstruction presented by projection 34, prevents the securing device from withstanding the substantial loading test.

From a view of FIGS. 1 and 2 it can be appreciated that it is desirable to insert support unit 15 after the electrical box 26 has been placed into appropriate wall aperture 12. Necessarily aperture 12 is of larger dimension than box 26. However, the dimension of aperture 12 cannot be too large or else an appropriate cover plate which is secured over box 26 will not be able to hide the poor workmanship. Accordingly, the spacing between the side walls 38 and 39 and the edges of aperture 12 is very small. As will be explained in more detail hereinbelow, it is necessary to insert the longitudinal member 9 of support 15 through the last mentioned space and then wrap the fingers 19 and 20 thereof around and into the box 26, see FIG. 1. In this manner the support provided by the longitudinal member 9 both above and below the aperture 12 prevents the electrical box 26 from being displaced forwardly of the aperture, and at the same time, ears 27 prevent its displacement rearwardly thereof. The small space between the side walls 38 and 39 and the side edges of aperture 12 does not permit easy manipulation of support unit 15 and it is, accordingly, common for a great number of these supports to be inadvertently dropped in an unretrievable position rearwardly of wall 10. Also the limited working space coupled with the fear of continually losing supports 15 can result in the attaching operation requiring a considerable amount of time and waste of money.

The securing device proper includes, as shown in FIG. 3, a flat metal bar 15 having clamping fingers 19 and 20 extending in parallel spaced relationship from one edge 9, of the bar member. Fingers 19 and 20 are of sufficient length to project, in a properly mounted bar position, through the wall, along the side 38 or 39 of the box, and reach over and be bent around and into the box. The material from which the securing devices can be constructed is of no significance, the only criterion being that it may be made of suitable ductile corrosive resistance metal to permit bending without breaking.

As shown in FIG. 3, one end of bar 15 extends somewhat less than the length of one of the fingers and terminates in a curved or beveled edge 16, while the other end extends and terminates in a straight flat edge 17 at as great or somewhat greater distance from the finger 19. The over-all size of the fastening device may be varied to accommodate different size switch boxes and wall apertures.

One limitation as to the space between the parallel fingers 19 and 20 is that Underwriters' specifications require that the clamping fingers be spaced away from the hot wire fastening contacts of the switch box, and be placed near the upper and lower ends of the box. This Underwriters' specification limitation presents problems in its own right. Accordingly, it can be appreciated that if both fingers 19 and 20 have parallel sides that are of the width and spacing required, for box supporting purposes, and the main body portion of the unit extends beyond the fingers in both directions a distance sufficient to insure that proper gripping conditions are provided by the unit relative to the rear surface of the wall, that it may not be possible to insert the fastening bar 15 and fingers 19 and 20 as a unit through the opening at the side of the box after the box has been placed in position in the wall opening. However, without disturbing the spacing of the fingers 19 and 20, from those required by the Underwriters' limitation, I am able to so arrange the device as to permit it to be easily passed through the wall opening and then be placed and brought into a holding position.

In other words, I am able to provide both fingers 19 and 20 with the desired width and spacing therebetween so that they will not come into possible contact with the hot wire connections in the receptacle and switching parts and yet permit the insertion of the unit after the switch box has been placed into the appropriate wall opening. It should be appreciated that a sufficient amount of abutting relationship between the edges 9, of ends 16 and 17, with the rear surface of the wall in which the aperture is made is also required in order to permit a sufficient gripping edge therebetween. The spacing of my fingers 19 and 20 relative to the longitudinal dimension of my bar 15, along the edge 9, not only permits the fingers to be positioned in gripping relationship to the side of the switch box at the upper and lower extremities thereof, but also insures that a proper gripping relationship between the edge 9 of the bar is maintained with the rear surface of the aperture containing wall. This is brought out in more detail in both FIGS. 1 and 2.

To maintain the proper spacial relationship between parallel fingers 19 and 20, and as well maintain the desired width of the fingers, I have provided my securing device to be of a particular shape. More particularly, I provide that a shaped cutaway portion be made in finger 19, such as to leave the base of the finger 19 approximately its normal width at the line of juncture with the bar 15, by way of merging curves 24 and 25 which in effect form a single curved recess. The effect of this recess is to shorten the distance between the extreme point of the curved terminating end 16 and the finger 19 without disturbing the spacing and proportions described. In the form shown in FIG. 3, the effect of this cutaway portion is that the one end 17 of the fastener may be inserted through the opening 12 beside the box, and be projected downwardly until the surfaces 24 and 25 engage the edges of the opening through the wall, this being the position shown in dot and dash lines at the entering position of the fastening device as shown in FIG. 2. In effect, the curved cutaway portion acts as a hinge or pivot about which the fastening device will rotate to permit easy entrance of the upper curved terminating extremity 16 through the opposite end of the wall opening.

By grasping the finger 20, the device is slid through the opening while the box is in a mounted position, and firmly held by the ears 27 against the wall. The bar 15 is swung rearwardly to the inward position as shown by the solid lines of FIG. 2. Initially, of course, bar 15 assumes a position spacially inwardly removed from the solid line position of FIG. 2. The recess 18 provided along the back edge 8 of the bar is then positioned in place around the protruding ear 34. One surface of bar 15 is, at the same time, contiguously positioned with the outer surface of side 38 or 39. Finally, the fingers 19 and 20 are selectively positioned with relation to the upper and lower wall surfaces of the box and the bar 15 is adjustably positioned to bring the terminating ends 16 and 17 behind the wall relative to the ends of the opening. A forwardly directed force is then provided to fingers 19 and 20 to forcibly embed the pointed projections or tines 6 and 7 into the rear surface of wall 10 above and below aperture 12, see FIGS. 1 and 2. Fingers 19 and 20 are then bent firmly inwardly over the edge of the box and against its inner sides while the switch box is still held by its ears 27 tightly against the wall.

In like manner, another bar fastener is then inserted with its long end at the opposite end of the hole beside the box, opposed to the position that the already mounted bar fastener has assumed, and its curved end 16 being swung inwardly. The recess 18 provided along the back edge of the bar is then drawn into position about protruding ear 34 of the switch box 26. By positioning the recess 18 about the protruding ear 34 the bar member will be properly positioned relative to the box and the opening to insure that fingers 19 and 20 assume the proper position relative to the upper and lower side walls of the box. In this manner, it can be seen that recess 18 must be properly located to not only accommodate the protruding ear 34 of the box but to insure that in its mounted position, relative to the protruding ear 34, that fingers 19 and 20 will assume the proper switch box position as required by underwriters' specifications. As shown in FIG. 3, in order to make the clamping device of universal type and permit the beveled terminating end to be inserted in an upwardly or downwardly position relative to the wall aperture, a pair of protruding ears accommodating recesses 18 may be provided. It should, of course, be emphasized that my invention is basic enough to include a single recess 18 which is located in either one of the positions shown, or to encompass two recesses as shown.

As illustrated in all the figures, particularly in FIG. 3, I have provided unit 15 with a pair of wall embedding or penetrating projections 6 and 7. While the drawings illustrate a pair of pointed projections or tines 6 and 7, it should, of course, be appreciated that this is meant only for purposes of illustration and is not intended to limit my invention. Along these lines, it is, of course, possible to utilize more or less pointed projections or tines than those illustrated without departing from the intended scope of my invention.

Furthermore, the location of the projections or tines 6 and 7 along the longitudinal dimension 9 of bar 15 is of no significance and can, accordingly, be positioned anywhere therealong. The only requirement being that the tines 6 and 7 be projected from the longitudinal dimension in the same direction as fingers 19 and 20 so that upon the unit being positioned inwardly of aperture 12 a forwardly directed force can be asserted upon fingers 19 and 20 to embed the tines 6 and 7 into the rear surface of the wall 10.

It may be appreciated that a critical relationship exists between the cutaway portion 24–25 of finger 19 and the most remote point of the beveled terminating end 16. Further, the bevel or curve 16 is of critical design and assumes a proper dimension such that the swinging of the bar through the opening is permitted by initial insertion of the long end 17 through the opening and pivoting the bar about the hinge point 24–25 of cutaway finger 19. The fact that the cutaway portion 24–25 does not extend throughout the length of the finger 19, but rather terminates at a point intermediate the end, insures that finger 19 will be of proper strength to support the box and, accordingly, does not detract from the strength of finger 19. At the same time curved end 16 terminates at a point beyond finger 20, along the inner edge 9, to assure a substantial amount of abutting relationship between edge 9 and the rear surface of the aperture containing wall.

If it is felt that a notch or recess 18 proximate and opposite to the cutaway portion 24–25 would unduly weaken the member, it is obvious that a single notch properly located as shown in FIG. 3, along the backward edge 8, at a position removed from the cutaway portion 24–25, will provide a suitably working fastening means to be able to accommodate both the upper and lower protruding ears 34 from the upper and lower surfaces of box 26 without detracting substantially from the rigidity of the bar member 15.

While it will be apparent that the embodiment of the invention herein described and disclosed is well calculated to fulfill the objects of the invention, it will be appreciated that the invention is susceptible to modification, variation, and change without departing from the proper scope or fair meaning of the appended claims.

I claim:

1. A switch box securing device comprising, a flat thin metal bar, laterally extending spacially removed fingers integrally formed with one edge of said bar, said bar terminating in a flat end substantially over one inch from the adjacent finger, and terminating in a beveled end sloping away from the edge to which said fingers are integrally with its most remote point being approximately one inch from its adjacent finger, a cutaway portion in the finger remote from said beveled end extending from a point intermediate the end of said finger and terminating in the adjacent side of the bar, said beveled edge and cutaway portion cooperating for insertion of the bar into the switch box wall aperture edgewise in an exposed finger position juxtaposed a switch box, said fingers extending along the outer surface of the sides of the box with the ends thereof inturned and terminating along the inner surface thereof, a first open-sided recess formed along the opposite edge of said bar to accommodate the laterally protruding switch box ganging means, said first open-sided recess being formed intermediate the flat end of said bar and its nearest laterally extending finger, a second open-sided recess formed on the opposite edge of said bar proximate said beveled end of said bar and its nearest finger and wall embedding projections emanating from the same edge of said bar as said fingers at the terminal ends thereof.

2. A switch box securing device comprising, a flat thin metal bar having a length several times greater than its width, laterally extending spacially removed fingers integrally formed with one edge of said bar, said bar terminating in a flat end a distance from one finger or substantially the length of a finger, and terminating in a beveled end sloping away from the edge to which said fingers are integrally formed a distance substantially less than the length of a finger, a cutaway portion in the finger remote from said beveled end extending from a point intermediate the end of said finger and terminating in the adjacent side of the bar, said beveled edge and cutaway portion cooperating for insertion of the bar into the switch box wall aperture edgewise in an exposed finger position juxtaposed a switch box, said fingers extending along the outer surface of the sides of the box with the ends thereof inturned and terminating along the inner surface thereof, an open-sided recess formed along the opposite edge of said bar proximate said flat end of said bar and substantially opposite to said cutaway portion, to accommodate the laterally protruding switch box ganging means, and a wall embedding tine emanating from the same edge of said bar as said fingers at a position intermediate one of said fingers and a terminal end of said bar.

3. A switch box securing device comprising, a flat thin metal bar having a length several times greater than its width, laterally extending spacially apart fingers integrally formed with one edge of said bar, said bar terminating in a flat end a distance from one finger or substantially the length of a finger, and terminating in a beveled end sloping away from the edge to which said fingers are integrally formed a distance substantially less than the length of a finger, a cutaway portion in the finger remote from said beveled end extending from a point intermediate the end of said finger and terminating in the adjacent side of the bar, said beveled edge and cutaway portion cooperating for insertion of the bar into the switch box wall aperture edgewise in an exposed finger position juxtaposed a switch box, said fingers extending along the outer surface of the sides of the box with the ends thereof inturned and terminating along the inner surface thereof, a first open-sided recess formed along the opposite edge of said bar to accommodate the laterally protruding switch box ganging means, said first open-sided recess being formed intermediate the flat end of said bar and its nearest laterally extending finger, a second open-sided recess formed on the opposite edge of said bar proximate said beveled end of said bar and its nearest finger, and a pair of wall embedding projections formed upon and emanating from the same edge of said bar as said fingers, said projections being formed ilong said edge between said fingers and a terminal end of said bar.

4. A switch box securing device comprising, a flat thin metal bar having a length several times greater than its width, laterally extending spacially apart fingers integrally formed with one edge of said bar, said bar terminating in a flat end a distance from one finger substantially the length of a finger, and terminating in a beveled end sloping away from the edge to which said fingers are integrally formed a distance substantially less than the length of a finger, a cutaway portion in the finger remote from said beveled end extending from a point intermediate the end of said finger and terminating in the adjacent side of the bar, said beveled edge and cutaway portion cooperating for insertion of the bar into the switch box wall aperture edgewise in an exposed finger position juxtaposed a switch box, said fingers extending along the outer surface of the sides of the box with the ends thereof inturned and terminating along the inner surface thereof, the opposite edge of said bar having an open-sided recess to accommodate the laterally protruding switch box ganging means formed therealong at a point remote from said beveled end of said bar, and wall embedding projections carried by and emanating from the same edge of said bar as said fingers.

5. A switch box securing device comprising, a flat thin metal bar having a length several times greater than its width, laterally extending spacially removed fingers integrally formed with one edge of said bar, said bar terminating in a flat end a distance from one finger substantially the length of a finger, and terminating in a beveled end sloping away from the edge to which said fingers are integrally formed a distance substantially less than the length of a finger, a cutaway portion in the finger remote from said beveled end extending from a point intermediate the end of said finger and terminating in the adjacent side of the bar, said beveled edge and cutaway portion cooperating for insertion of the bar into the switch box wall aperture edgewise in an exposed finger position juxtaposed a switch box, said fingers extending along the outer surface of the sides of the box with the ends thereof inturned and terminating along the inner surface thereof, the opposite edge of said bar having an open-sided recess to accommodate the laterally protruding switch box ganging means formed therealong at a point remote from said flat end of said bar, and a wall embedding pointed projection extending from the same edge of said bar as said fingers between one of said fingers and a terminal end of said bar such that upon said device being positioned with said recess aligned to accommodate said switch ganging means a forwardly directed force is asserted to embed said projection into the wall.

References Cited

UNITED STATES PATENTS

| | | | |
|---|---|---|---|
| 2,454,119 | 11/1948 | Atkinson | 248—27 |
| 2,514,755 | 7/1950 | Gardner | 248—27 |
| 2,665,865 | 1/1954 | Bell | 248—27 |

ROY D. FRAZIER, *Primary Examiner.*

CLAUDE A. LE ROY, *Examiner.*

J. F. FOSS, *Assistant Examiner.*